(12) United States Patent
Hou et al.

(10) Patent No.: US 12,222,251 B2
(45) Date of Patent: Feb. 11, 2025

(54) MEASUREMENT CIRCUIT OF THIN-FILM TEMPERATURE SENSOR

(71) Applicant: NINGBO CRRC TIMES TRANSDUCER TECHNOLOGY CO., LTD., Ningbo (CN)

(72) Inventors: Xiaowei Hou, Ningbo (CN); Yang Lv, Ningbo (CN); Liangguang Zheng, Ningbo (CN); Junjie Guo, Ningbo (CN); Juping Li, Ningbo (CN); Po Zhang, Ningbo (CN)

(73) Assignee: NINGBO CRRC TIMES TRANSDUCER TECHNOLOGY CO., LTD., Ningbo (CN)

( * ) Notice: Subject to any disclaimer, the term of this patent is extended or adjusted under 35 U.S.C. 154(b) by 416 days.

(21) Appl. No.: 17/758,373

(22) PCT Filed: Jul. 15, 2020

(86) PCT No.: PCT/CN2020/102008
§ 371 (c)(1),
(2) Date: Jul. 5, 2022

(87) PCT Pub. No.: WO2021/139128
PCT Pub. Date: Jul. 15, 2021

(65) Prior Publication Data
US 2023/0026496 A1    Jan. 26, 2023

(30) Foreign Application Priority Data

Jan. 6, 2020   (CN) .................. 202010009982.6

(51) Int. Cl.
*G01K 7/21* (2006.01)
*G01K 7/20* (2006.01)

(52) U.S. Cl.
CPC ............... *G01K 7/21* (2013.01); *G01K 7/206* (2013.01)

(58) Field of Classification Search
CPC .................... G01K 7/21; G01K 7/206
See application file for complete search history.

(56) References Cited

FOREIGN PATENT DOCUMENTS

| CN | 203323910 U | 12/2013 |
| CN | 105157867 A | 12/2015 |

(Continued)

OTHER PUBLICATIONS

International Search Report dated Oct. 19, 2020 from PCT Application No. PCT/CN2020/102008, 8 pages.

*Primary Examiner* — Metasebia T Retebo
(74) *Attorney, Agent, or Firm* — INNOVATION CAPITAL LAW GROUP, LLP; Vic Lin

(57) ABSTRACT

A measurement circuit of thin-film temperature sensor comprises: out-phase input end and output end of first operational amplifier are connected to first end of thin-film resistor; first end of first resistor is connected to output end of first operational amplifier, second end of first resistor is connected to in-phase input end of first operational amplifier; second end of first resistor is grounded via second resistor; output end of second operational amplifier is connected to first end of potentiometer; second end of the potentiometer is connected to the constant current source and in-phase input end of second operational amplifier respectively; first end of third resistor is connected to output end of second operational amplifier, second end of third resistor is connected to out-phase input end of second operational amplifier; second end of third resistor is grounded via fourth resistor; voltage value of second end of potentiometer is output signal.

8 Claims, 2 Drawing Sheets

(56) References Cited

FOREIGN PATENT DOCUMENTS

| | | | |
|---|---|---|---|
| CN | 105181167 A | 12/2015 | |
| CN | 105890793 A | 8/2016 | |
| CN | 105910726 A | 8/2016 | |
| CN | 105973497 A * | 9/2016 | ............... G01K 7/20 |
| CN | 107529233 A | 12/2017 | |
| CN | 109520635 A | 3/2019 | |
| CN | 209485564 U | 10/2019 | |
| CN | 111238673 A | 6/2020 | |
| DE | 2460648 A1 | 6/1976 | |

* cited by examiner

MEASUREMENT CIRCUIT OF THIN-FILM TEMPERATURE SENSOR

TECHNICAL FIELD

The present invention relates to the technical field of thin-film temperature sensors, and in particular to a measure circuit of a thin-film temperature sensor.

DESCRIPTION OF RELATED ART

The traditional nonlinear compensation method is only for a specific platinum resistor, its nonlinear characteristics are fixed, and its nonlinear parameters are known, so fixed parameters are used in the circuit to carry out adjustment. For example, Chinese patent CN201610495133.X discloses a hardware nonlinear compensation method for platinum resistor temperature measurement. In the technical solution of this patent document, a nonlinear compensation circuit is used to take a part of the positive feedback from the output of the measurement circuit to the input end of the measurement circuit, and the feedback current gradually increases with the increase of temperature, so that the circuit achieves good tracking characteristics, and can take a good compensation effect in a low-temperature area and a high-temperature area, so as to correct the nonlinear error of platinum resistor temperature measurement. The measurement device is composed of a bias compensation circuit, a measurement circuit, a nonlinear compensation circuit, a gain circuit and a reference voltage circuit. In addition, Chinese patent CN201610064545.8 discloses a Three-wire Pt100 platinum resistance temperature measurement circuit, including: a Pt100 platinum resistance sensor, a constant current source, an operational amplifier, a first resistor, a second resistor, a third resistor, a fourth resistor and a fifth resistor. The output end of the constant current source is connected with a first end of the Pt100 platinum resistance sensor; the first resistor, the second resistor and the third resistor are connected in series to form a whole body, and after series connection, one end of the resistor whole body is connected with the constant current source, and the other end thereof is connected with a third end of the Pt100 platinum resistance sensor and is grounded; the positive input end of the operational amplifier is connected between the second resistor and the third resistor; the negative input end of the operational amplifier is connected with a second end of the Pt100 platinum resistance sensor through the fourth resistor; and the fifth resistor is connected between the negative input end and the output end of the operational amplifier. The temperature measurement circuit set forth in the technical solutions disclosed in the above patent documents adopts fixed parameters for adjustment, which has poor versatility and cannot meet the interchangeability requirement of different sensors.

BRIEF SUMMARY OF THE INVENTION

The technical problem to be solved by the present invention is to provide a measurement circuit of a thin-film temperature sensor to overcome the above-mentioned deficiencies of the prior art. The measurement circuit of a thin-film temperature sensor can adapt to different nonlinear parameters within a certain change range, achieve analog correction and transmission, and meet the interchangeability requirement of different sensors.

The measurement circuit of a thin-film temperature sensor includes: a first operational amplifier (U1), a second operational amplifier (U2), a potentiometer (R1), a thin-film resistor (Rt), a first resistor (R6), a second resistor (R7), a third resistor (R8), and a fourth resistor (R9);

an out-phase input end and an output end of the first operational amplifier (U1) are both connected to a first end of the thin-film resistor (Rt); a second end of the thin-film resistor (Rt) is connected to a constant current source; a first end of the first resistor (R6) is connected to the output end of the first operational amplifier (U1), and a second end of the first resistor (R6) is connected to an in-phase input end of the first operational amplifier (U1); a second end of the first resistor (R6) is grounded via the second resistor (R7); an output end of the second operational amplifier (U2) is connected to a first end of the potentiometer (R1); a second end of the potentiometer (R1) is connected to the constant current source and an in-phase input end of the second operational amplifier (U2) respectively; a first end of the third resistor (R8) is connected to the output end of the second operational amplifier (U2), and a second end of the third resistor (R8) is connected to an out-phase input end of the second operational amplifier (U2); the second end of the third resistor (R8) is grounded via the fourth resistor (R9); the voltage value of the second end of the potentiometer (R1) is an output signal.

Further, the potentiometer (R1) is configured as a digital potentiometer.

Further, the measurement circuit of a thin-film temperature sensor further includes: a capacitor (C1); a first end of the capacitor (C1) is connected to the out-phase input end of the first operational amplifier (U1), and a second end of the capacitor (C1) is connected to the output end of the first operational amplifier (U1).

Further, the resistance values of the first resistor (R6) and the second resistor (R7) are equal; the resistance values of the third resistor (R8) and the fourth resistor (R9) are equal.

Further, the first operational amplifier (U1) and the second operational amplifier (U2) are configured as operational amplifiers with high input impedance.

Further, the first resistor (R6), the second resistor (R7), the third resistor (R8), and the fourth resistor (R9) are configured as high-precision metal-film resistors.

Further, the resistance values of the first resistor (R6), the second resistor (R7), the third resistor (R8), and the fourth resistor (R9) are all equal.

Further, the thin-film resistor (Rt) is configured as a platinum resistor.

In the technical solution of the present invention, by adjusting the resistance value of the potentiometer R1, the maximum nonlinear error of the output of the thin-film temperature sensor meets the measurement requirements within a predetermined temperature range, and can be adapted to different nonlinear parameters to meet the interchangeability requirements of different sensors. In addition, the measurement circuit of a thin-film temperature sensor can automatically compensate the lead resistance of the wire, thereby completely or partially eliminating the influence of lead resistance on the measurement accuracy.

DETAILED DESCRIPTION OF THE INVENTION

The following are specific embodiments of the present invention and further describe the technical solutions of the present invention in conjunction with the accompanying drawings, but the present invention is not limited to these embodiments. In the following description, specific details such as specific configurations and components are provided merely to assist in a comprehensive understanding of embodiments of the present invention. Accordingly, it should be apparent to those skilled in the art that various changes and modifications of the embodiments described herein can be made without departing from the scope and spirit of the invention. In addition, descriptions of well-known functions and constructions are omitted for clarity and conciseness.

It should be noted that, for the convenience of description, the reference signs of resistors in the embodiments of the present application are also used to indicate corresponding resistance values.

Figure 1:
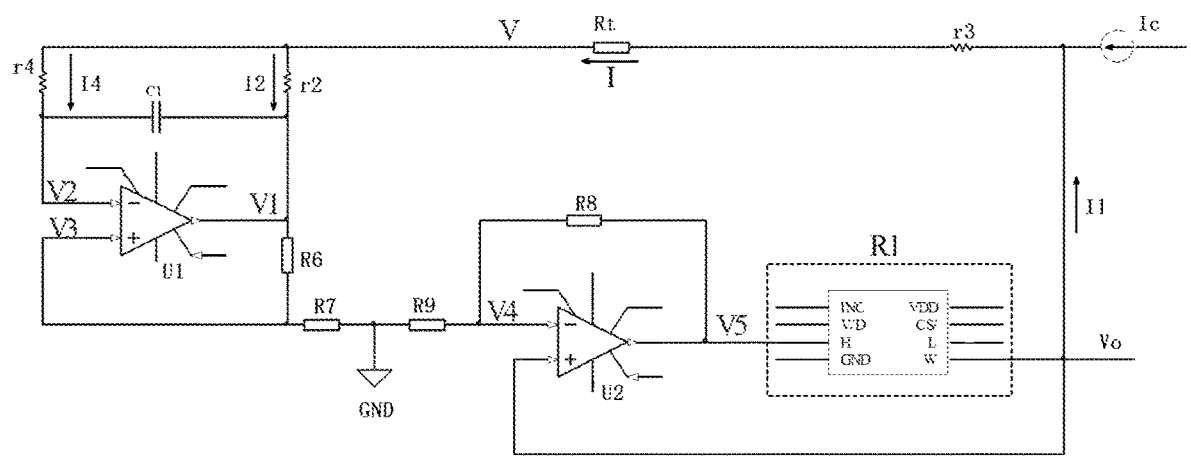
FIG. 1 is a circuit diagram of a measurement circuit of a thin-film temperature sensor in an embodiment of the present invention.

Referring to FIG. 1, the measurement circuit of a thin-film temperature sensor includes: a first operational amplifier U1, a second operational amplifier U2, a potentiometer R1, a thin-film resistor Rt, a first resistor R6, a second resistor R7, a third resistor R8, and a fourth resistor R9. The circuit components are connected as follows: an out-phase input end and an output end of the first operational amplifier U1 are both connected to a first end of the thin-film resistor (Rt); a second end of the thin-film resistor Rt is connected to a constant current source; a first end of the first resistor R6 is connected to the output end of the first operational amplifier U1, and a second end of the first resistor R6 is connected to an in-phase input end of the first operational amplifier U1; a second end of the first resistor R6 is grounded via the second resistor R7; an output end of the second operational amplifier U2 is connected to a first end of the potentiometer R1; a second end of the potentiometer R1 is connected to the constant current source and an in-phase input end of the second operational amplifier U2 respectively; a first end of the third resistor R8 is connected to the output end of the second operational amplifier U2, and a second end of the third resistor R8 is connected to an out-phase input end of the second operational amplifier U2; the second end of the third resistor R8 is grounded via the fourth resistor R9; the voltage value of the second end of the potentiometer R1 is an output signal.

In the embodiments of the present invention, the measurement circuit of a thin-film temperature sensor can automatically compensate the lead resistance of the wire, thereby completely or partially eliminating the influence of lead resistance on the measurement accuracy.

In some embodiments, the resistance values of the first resistor R6 and the second resistor R7 are equal and the resistance values of the third resistor R8 and the fourth resistor R9 are equal, that is, R6=R7, R8=R9.

In some embodiments, the resistance values of the first resistor R6, the second resistor R7, the third resistor R8, and the fourth resistor R9 are all equal, that is, R6=R7=R8=R9.

As shown in FIG. 1, a lead resistor r3 is arranged between the second end of the thin-film resistor Rt and the constant current source; a lead resistance r2 is arranged between the output end of the first operational amplifier U1 and the first end of the thin-film resistor Rt; a lead resistor r4 is arranged between the out-phase input end of the first operational amplifier U1 and the first end of the thin-film resistor Rt. For convenience of explanation, the lead resistor r2, the lead resistor r3, and the lead resistor r4 are shown in FIG. 1. The voltage value of the second end of the potentiometer R1 is denoted as $V_0$; the voltage of the first end of the thin film resistor Rt is denoted as V; the voltage of the output end of the first operational amplifier U1 is denoted as V1, the voltage of the out-phase input end of the first operational amplifier U1 is denoted as V2, and the voltage of the in-phase input end of the first operational amplifier U1 is denoted as V3; the voltage of the second end of the third resistor R8 is denoted as V4, and the voltage of the first end of the third resistor R8 is denoted as V5; the current on a connecting wire between the second end of the potentiometer R1 and the constant current source is denoted as I1; the current on a wire between the out-phase input end of the first operational amplifier U1 and the first end of the thin-film resistor Rt is denoted as I4; the current on a wire between the output end of the first operational amplifier U1 and the first end of the thin-film resistor Rt is denoted as I2. The voltage value $V_0$ of the second end of the potentiometer R1 is used to calculate the measured temperature.

It should be noted that, by adjusting the resistance value of the potentiometer R1, the maximum nonlinear error of the output of the thin-film temperature sensor within a predetermined temperature range can meet the measurement requirements, and can be adapted to different nonlinear parameters.

Specifically, the resistance values of the lead resistors r2, r3, and r4 are set to be equal and are all r; the constant current source Ic is used as the external excitation current of the thin-film resistor, and then the actual working current I passing through the thin-film resistor Rt is: I=Ic±I1=I2+I4, where I4=0.

For the first operational amplifier U1, there are the following relationships:

$$V_1 = V - I_2 r_2,\ V_2 = V,\ V_3 = \frac{1}{2} V_1,\ V_2 = V_3;$$

it can be concluded that V=−Ir so, $V_c$=V+I($r_s$+$R_t$)=−Ir+Ir+I$R_t$=I$R_t$. It can be seen that the lead resistor has no effect on the voltage value $V_0$ (i.e., the output signal) of the second end. Therefore, the measurement circuit of the thin-film temperature sensor can automatically compensate the lead resistances r1, r2, r3 of the wire, and eliminate the influence of the lead resistors on the measurement result.

It can be seen from the above equation that at least part of the influence of the lead resistances can be offset, and when the lead resistances are equal, the influence can be completely eliminated. In addition, in this embodiment, the part that is not offset by the lead resistance can also be regarded as a constant term in the characteristic of the thin-film resistor Rt and is corrected by the potentiometer R1 in a unified manner.

For the second operational amplifier U2, there are the following relationships:

$$V_0 = V_4 = V_5 \pm I_1 R_1,\ V_4 = \frac{1}{2} V_5,$$

it can be concluded that $V_c$=±$I_1 R_1$; the resistance value of the potentiometer R1 can be automatically adjusted and set by a controller as required.

Based on the above relationship equations, it can be concluded that I$R_t$=±$I_t R_t$, that is, $$I_1 = \pm \frac{IR_t}{R_1},$$

from $I=I_c+I_1$, the following can be obtained:

$$\begin{cases} I = \dfrac{I_c R_1}{R_1 \pm R_t} \\ V_0 = IR_t = \dfrac{I_c R_1 R_t}{R_1 \pm R_t} \end{cases};$$

It can be seen from this equation that under the premise that the external excitation constant current source Ic is fixed, the actual working current through the thin-film resistor is determined by both the resistance value of the thin film resistor Rt and the potentiometer R1, and its value can be optimized and determined according to the temperature characteristic curve of the thin-film resistor Rt. As the temperature rises, by properly configuring the value of the potentiometer R1, the effect of decreasing or increasing the increase rate of the resistance of the thin-film resistor Rt and the effect of increasing or decreasing the increase rate of $$\frac{R_1}{R_1 \pm R_t}$$

are exactly offset, so as to achieve nonlinear correction and linear output.

In the embodiment of the present application, the key to achieve the expected nonlinear compensation function lies in the selection of the resistance value of R1, and the value of the potentiometer R1 is adjusted so that the coefficients of the second-order or higher terms of $$V_0 = \frac{I_c R_1 R_t}{R_1 \pm R_t}$$

are zero, and this can be obtained by numerical solution. The objective function is set as the maximum nonlinear error of $V_0$ and the measured temperature, and the value of the potentiometer R1 is determined, so that within a predetermined temperature range, the maximum nonlinear error of the output meets the measurement requirements. To sum up, by adjusting the resistance value of the potentiometer R1, the maximum nonlinear error of the output of the thin-film temperature sensor within a predetermined temperature range can meet the measurement requirements. By changing the resistance value of the potentiometer R1, the measurement circuit can adapt to different nonlinear parameters and achieve analog correction and transmission, thereby meeting the interchangeability requirements of different sensors.

In some embodiments, the thin-film resistor Rt is configured as a platinum resistor.

In some embodiments, the first resistor R6, the second resistor R7, the third resistor R8, and the fourth resistor R9 are configured as high-precision metal-film resistors.

In some embodiments, the potentiometer R1 is configured as a digital potentiometer. The digital potentiometer adopts the numerical control method to adjust the resistance value, thus achieving the advantages of flexible use and high adjustment accuracy.

In some embodiments, the measurement circuit of a thin-film temperature sensor further includes: a capacitor C1; a first end of the capacitor C1 is connected to the out-phase input end of the first operational amplifier U1, and a second end of the capacitor C1 is connected to the output end of the first operational amplifier U1. The capacitor C1 can be used to suppress high-frequency signals.

In some embodiments, the first operational amplifier U1 and the second operational amplifier U2 are configured as operational amplifiers with high input impedance.

The above process of determining the resistance value of the potentiometer R1 will be described below in conjunction with a specific example. The resistance values of the first resistor R6, the second resistor R7, the third resistor R8 and the fourth resistor R9 are all 10 KΩ; the external excitation constant current source is 3 mA; the temperature characteristic of the thin-film resistor Ra can be obtained as follows:

$$R_a(t)=100 \times (1+3.8 \times 10^{-3}t+9.8 \times 10^{-7}t^2)$$

Figure 2:
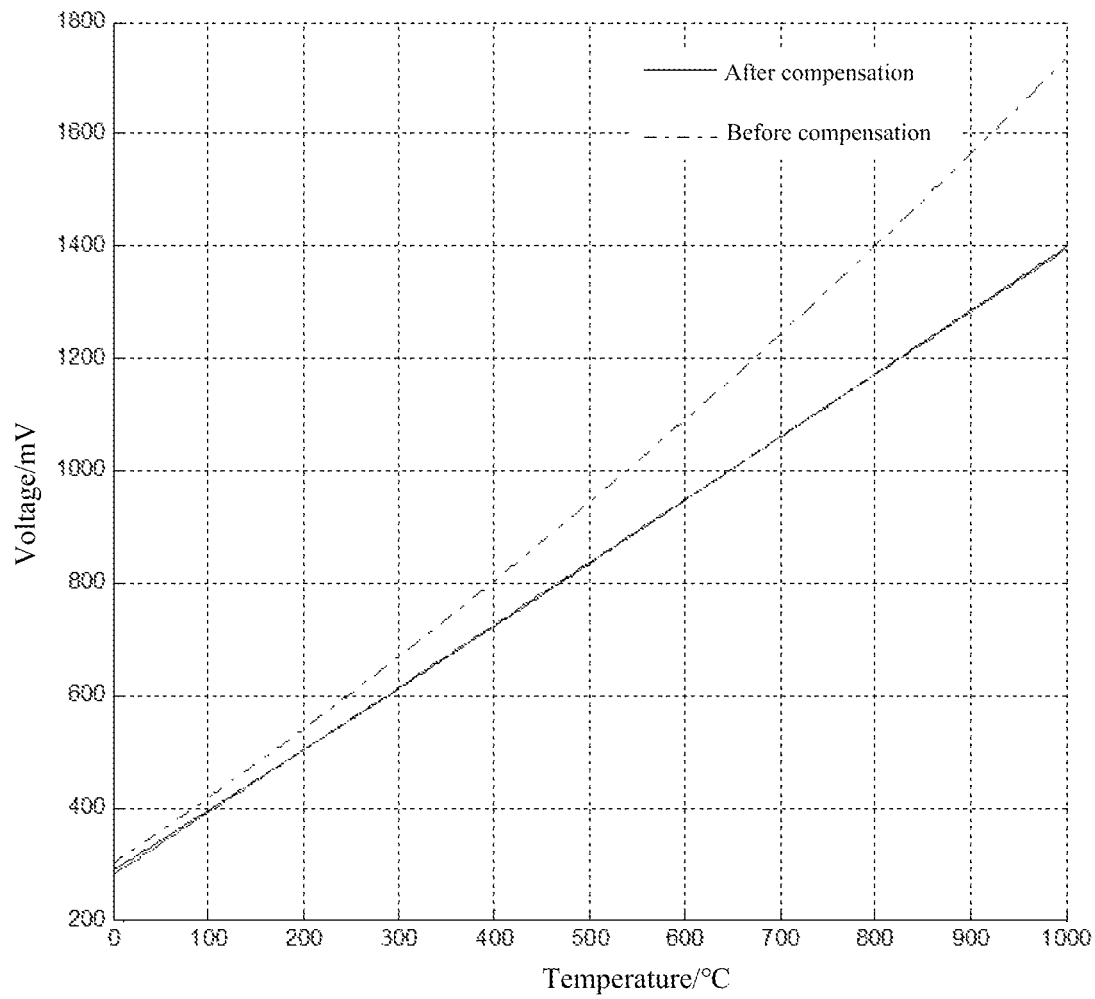
FIG. 2 is an output curve of the relationship between voltage and temperature before and after compensation in a specific example in the embodiment of the present invention.

The objective function is set as the maximum nonlinear error of $V_0$ and temperature t, and the value of R1 is optimized so that in a given temperature range, the maximum nonlinear error of the output can meet the measurement requirements. The objective function, i.e., the maximum nonlinear error of $V_0$ and t is 10', and the resistance value of the potentiometer R1 is 2364.6Ω after optimization according to the above method. In combination with the standard of resistance series, it is finally obtained that R1=2.4kΩ. FIG. 2 shows the output curves before and after compensation. In this case, the fitting straight line of the output voltage $V_0$ and the temperature t is: V=1.114*t+279.96, and the standard deviation of the linear fitting is 84.757.

The present invention mainly implements the dynamic adjustment and control of the actual working current of the thin-film resistor through the ingenious circuit structure and the high input impedance of the operational amplifier and the properties of virtual open circuit and virtual short circuit, so as to achieve the purpose of correcting the non-linearity of the temperature sensitive characteristic of the thin-film resistor. And the circuit structure is simple and reliable.

In the technical solution of the present application, in view of the nonlinear problem of the output of the thin-film temperature sensor, combined with the specific characteristics of its nonlinearity having a certain dispersion, a measurement circuit of the thin-film temperature sensor is provided, that is, by dynamically adjusting the excitation current flowing through the thin-film resistor, the nonlinear output characteristics of the thin-film resistor with temperature changes can be compensated, and the function of compensating for long wire resistance is achieved. The measurement circuit of a thin-film temperature sensor can adapt to different nonlinear parameters within a certain change range, achieve analog correction and transmission, and meet the interchangeability requirement of different sensors. The circuit structure is simple, and the complex resistor network configuration is avoided. The measurement accuracy of the thin-film temperature sensor is improved.

Terms "first" and "second" are used for descriptive purposes only and are not to be construed as indicating or implying a relative importance or implicitly indicating the number of technical features indicated. Thus, features defined by the term "first" or "second" may include at least one of the features, either explicitly or implicitly. In the description of the present invention, the meaning of "a plurality of" is at least two, such as two, three, etc., unless specifically defined otherwise.

The specific embodiments described herein are only examples to illustrate the spirit of the present disclosure. Those skilled in the art to which the invention belongs can make various modifications or additions to the specific embodiments described or use similar alternatives, without departing from the spirit of the invention or going beyond the scope defined in the appended claims.

What is claimed is:

1. A measurement circuit of a thin-film temperature sensor, comprising: a first operational amplifier (U1), a second operational amplifier (U2), a potentiometer (R1), a thin-film resistor (Rt), a first resistor (R6), a second resistor (R7), a third resistor (R8), and a fourth resistor (R9), wherein
an out-phase input end and an output end of the first operational amplifier (U1) are both connected to a first end of the thin-film resistor (Rt); a second end of the thin-film resistor (Rt) is connected to a constant current source; a first end of the first resistor (R6) is connected to the output end of the first operational amplifier (U1), and a second end of the first resistor (R6) is connected to an in-phase input end of the first operational amplifier (U1); the second end of the first resistor (R6) is grounded via the second resistor (R7);
an output end of the second operational amplifier (U2) is connected to a first end of the potentiometer (R1); a second end of the potentiometer (R1) is connected to the constant current source and an in-phase input end of the second operational amplifier (U2) respectively; a first end of the third resistor (R8) is connected to the output end of the second operational amplifier (U2), and a second end of the third resistor (R8) is connected to an out-phase input end of the second operational amplifier (U2); the second end of the third resistor (R8) is grounded via the fourth resistor (R9); the voltage value of the second end of the potentiometer (R1) is an output signal.

2. The measurement circuit of a thin-film temperature sensor according to claim 1, wherein the potentiometer (R1) is configured as a digital potentiometer.

3. The measurement circuit of a thin-film temperature sensor according to claim 1, further comprising: a capacitor (C1), a first end of the capacitor (C1) being connected to the out-phase input end of the first operational amplifier (U1), and a second end of the capacitor (C1) being connected to the output end of the first operational amplifier (U1).

4. The measurement circuit of a thin-film temperature sensor according to claim 1, wherein the resistance values of the first resistor (R6) and the second resistor (R7) are equal; the resistance values of the third resistor (R8) and the fourth resistor (R9) are equal.

5. The measurement circuit of a thin-film temperature sensor according to claim 1, wherein the first operational amplifier (U1) and the second operational amplifier (U2) are configured as operational amplifiers with high input impedance.

6. The measurement circuit of a thin-film temperature sensor according to claim 1, wherein the first resistor (R6), the second resistor (R7), the third resistor (R8), and the fourth resistor (R9) are configured as high-precision metal-film resistors.

7. The measurement circuit of a thin-film temperature sensor according to claim 4, wherein the resistance values of the first resistor (R6), the second resistor (R7), the third resistor (R8), and the fourth resistor (R9) are all equal.

8. The measurement circuit of a thin-film temperature sensor according to claim 1, wherein the thin-film resistor (Rt) is configured as a platinum resistor.

* * * * *